United States Patent
Englot et al.

(10) Patent No.: US 9,858,803 B2
(45) Date of Patent: Jan. 2, 2018

(54) GAS DETECTORS SAFETY COMPLIANCE ADVERTISEMENT VIA LOW-POWER WIRELESS RADIO

(71) Applicant: Honeywell International Inc., Morristown, NJ (US)

(72) Inventors: Kelly Englot, Calgary (CA); Stephen Mroszczak, Calgary (CA); Kirk William Johnson, Calgary (CA); Mahdi Javer, Calgary (CA)

(73) Assignee: Honeywell International Inc., Morris Plains, NJ (US)

( * ) Notice: Subject to any disclaimer, the term of this patent is extended or adjusted under 35 U.S.C. 154(b) by 123 days.

(21) Appl. No.: 14/825,107

(22) Filed: Aug. 12, 2015

(65) Prior Publication Data

US 2017/0046945 A1    Feb. 16, 2017

(51) Int. Cl.
| | |
|---|---|
| *G08B 29/00* | (2006.01) |
| *G08B 29/04* | (2006.01) |
| *G08B 21/14* | (2006.01) |
| *G08B 29/18* | (2006.01) |
| *H04W 4/00* | (2009.01) |

(52) U.S. Cl.
CPC ............. *G08B 29/04* (2013.01); *G08B 21/14* (2013.01); *G08B 29/18* (2013.01); *H04W 4/008* (2013.01); *Y02B 60/50* (2013.01)

(58) Field of Classification Search
CPC ........ G08B 29/04; G08B 21/14; G08B 29/00; G08B 29/20; G08B 29/40; G08B 29/18; H04W 4/008; G01N 33/0006
USPC ........................................................ 340/506
See application file for complete search history.

(56) References Cited

U.S. PATENT DOCUMENTS

| | | | | |
|---|---|---|---|---|
| 7,345,590 | B2* | 3/2008 | Nakano ................. | G08B 21/16 340/539.26 |
| 2012/0007736 | A1* | 1/2012 | Worthington ........ | G08B 17/117 340/539.22 |
| 2013/0109323 | A1* | 5/2013 | Ruutu .................. | H04B 5/0031 455/68 |

(Continued)

FOREIGN PATENT DOCUMENTS

| | | |
|---|---|---|
| CN | 106442883 A | 2/2017 |
| EP | 2293267 A1 | 3/2011 |
| WO | 02058026 A1 | 7/2002 |

OTHER PUBLICATIONS

Janne Takalo-Mattila; Jussi Kiljander; Juha-Pekka Soininen; "Advertising semantically described physical items with Bluetooth Low Energy beacons," 2013 2nd Mediterranean Conference on Embedded Computing (MECO); 2013; pp. 211-214.*

(Continued)

*Primary Examiner* — Nader Bolourchi
(74) *Attorney, Agent, or Firm* — Conley Rose, P.C.

(57) ABSTRACT

Embodiments relate generally to systems and methods for indicating when a gas detector is out of compliance. A Bluetooth Low Energy (BLE) enabled wireless gas-detector may allow for an advertisement packet to be transmitted from the gas detector. This advertisement packet may contain information about the gas detector to allow remote auditing from any BLE enabled remote listening device. This auditor device may be in the form of a mobile device, such as a cell phone or tablet, a fixed location auditor device, or any other BLE enabled device.

20 Claims, 2 Drawing Sheets

(56) References Cited

U.S. PATENT DOCUMENTS

2016/0088424 A1* 3/2016 Polo .................... H04W 4/008
455/41.1
2017/0026723 A1* 1/2017 Wan ........................ H04Q 9/00

OTHER PUBLICATIONS

Mikhail Galeev; "Bluetooth 4.0: An introduction to Bluetooth Low Energy—Part I,"EE Times, Jul. 14, 2011 [reterived on Feb. 12, 2017]; <online: http://www.eetimes.com/document.asp?doc_id=1278927>.*

Mikhail Galeev; "Make the most of Bluetooth LE advertising mode,"EE Times, Apr. 9, 2013, [reterived on Feb. 12, 2017]; <online: http://www.eetimes.com/document.asp?doc_id=1280724>.*

Europe Patent Application No. 16182865.2, Extended European Search Report, dated Jan. 1, 2017, 10 pages.

Takalo-Mattila Janne et al., "Advertising semantically described physical items with Bluetooth Low Energy beacons", 2013 2nd Mediterranean Conference on Embedded Computing (MECO,) IEEE, dated Jun. 15, 2013, pp. 211-214.

* cited by examiner

GAS DETECTORS SAFETY COMPLIANCE ADVERTISEMENT VIA LOW-POWER WIRELESS RADIO

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

BACKGROUND

In hazardous work environments, user may carry gas detectors with them as they work, to allow for detection of gas exposure. The gas detector may alert the user if an exposure limits are reached while the user is wearing the gas detector. Gas detectors may comprise interfaces for communicating with the user, such as displays, lights, buzzers, and input buttons. Gas detectors may be configured with settings for alarms, exposure limits, display settings, light and buzzer settings, etc. Also, maintenance checks and testing of the gas detectors may be performed regularly to ensure that the gas detectors are working properly.

SUMMARY

Aspects of the disclosure may include embodiments of a method for indicating when a gas detector is non-compliant comprising: providing a gas detector comprising a Bluetooth Low Energy (BLE) communicator; providing an auditor device comprising a BLE communicator; broadcasting, by the gas detector, an advertisement packet, when the gas detector is non-compliant with predefined standards, wherein the advertisement packet comprises non-compliance information; receiving, by the auditor device, the advertisement packet from the gas detector; and indicating, by the auditor device, that the gas detector is non-compliant.

In some embodiments, the non-compliance information comprises one or more of the following: a user identifier, a gas detector identifier, a general non-compliance indication, and specific maintenance, testing, and settings that are non-compliant on the gas detector. In some embodiments, the method may further comprise inputting the compliance standards to the gas detector. In some embodiments, the method may further comprise displaying, by the auditor device, the non-compliance information of the advertisement packet. In some embodiments, the method may further comprise updating the gas detector to meet the compliance standards, before the gas detector is used in a work area. In some embodiments, the advertisement packet is broadcast to any BLE enabled device within the range of the gas detector. In some embodiments, indicating that the gas detector is non-compliant comprises initiating an alarm, a light, a beeper, and/or a buzzer of the auditor device. In some embodiments, indicating that the gas detector is non-compliant comprises displaying a message on a display of the auditor device. In some embodiments, the auditor device comprises a mobile auditor device, which is carried by an auditor, supervisor, or safety inspector in the worksite. In some embodiments, the auditor device comprises a fixed auditor device, which is placed at one of the following: an entry point, a check point, a door, and a turnstile.

Additional aspects of the disclosure may include embodiments of a method for indicating when a gas detector is non-compliant comprising providing a gas detector comprising a Bluetooth Low Energy (BLE) communicator; providing an auditor device comprising a BLE communicator; determining that the gas detector is non-compliant with predefined standards; generating, by the gas detector, a broadcast packet containing non-compliance information; broadcasting, by the gas detector, the advertisement packet to any BLE enabled device within the broadcast range of the gas detector; receiving, by the auditor device, the advertisement packet from the gas detector; and indicating, by the auditor device, that the gas detector is non-compliant.

In some embodiments, the auditor device comprises a mobile auditor device, which is carried by an auditor, supervisor, or safety inspector in the worksite. In some embodiments, the method may further comprise bringing the mobile auditor device within the broadcast range of the gas detector. In some embodiments, the auditor device comprises a fixed auditor device, which is placed at one of the following: an entry point, a check point, a door, and a turnstile. In some embodiments, the method may further comprise bringing the gas detector in proximity to the fixed auditor device, such that the fixed auditor device is within the broadcast range of the gas detector.

Other aspects of the disclosure may include embodiments of a gas detector system comprising a gas detector device comprising a Bluetooth Low Energy (BLE) communicator, wherein the gas detector is operable to determine that the gas detector does not meet predefined compliance standards; generate an advertisement packet containing non-compliance information; broadcast the advertisement packet via BLE; and an auditor device comprising a BLE receiver, wherein the auditor device is operable to receive the advertisement packet via BLE; and indicate that the gas detector is on-compliant.

In some embodiments, the auditor device comprises a display and is further operable to display the non-compliance information. In some embodiments, the auditor device comprises an application operable to receive the advertisement packet, process the advertisement packet, and display the information contained in the advertisement packet. In some embodiments, the auditor device comprises a mobile auditor device, which is carried by an auditor, supervisor, or safety inspector in the worksite. In some embodiments, the auditor device comprises a fixed auditor device, which is placed at one of the following: an entry point, a check point, a door, and a turnstile.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
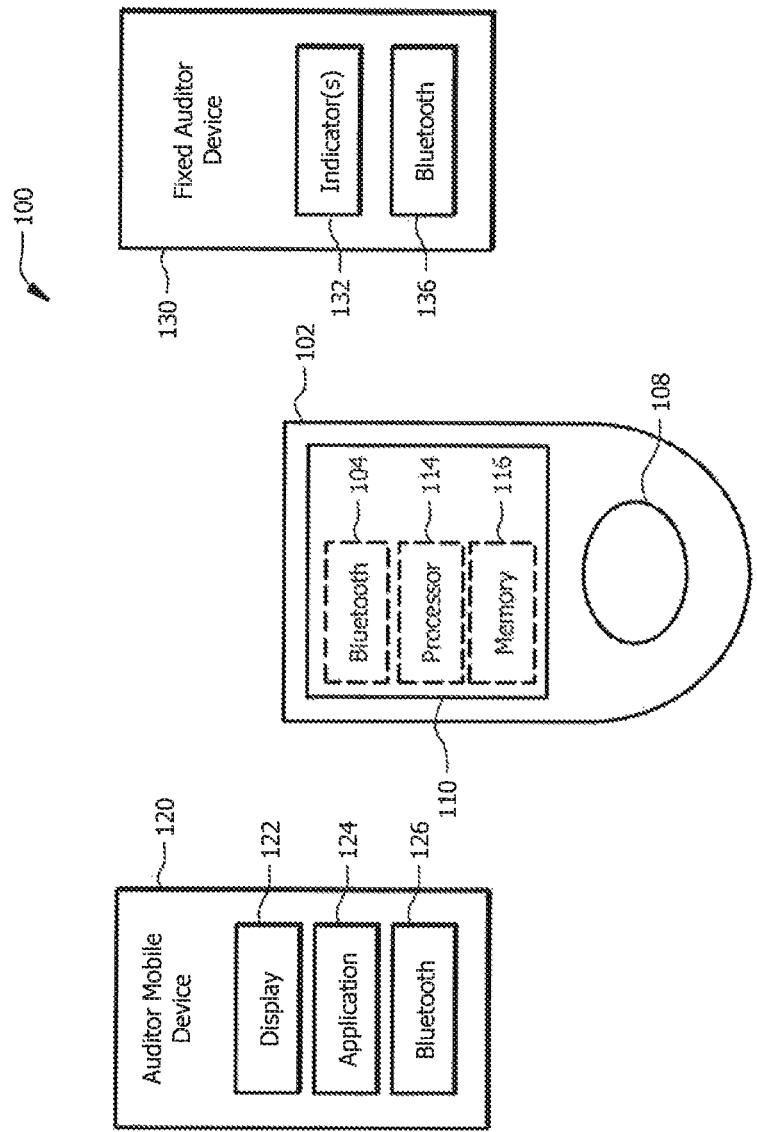
FIG. 1 illustrates a gas detector system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

The following brief definition of terms shall apply throughout the application:

The term "comprising" means including but not limited to, and should be interpreted in the manner it is typically used in the patent context;

The phrases "in one embodiment," "according to one embodiment," and the like generally mean that the particular feature, structure, or characteristic following the phrase may be included in at least one embodiment of the present invention, and may be included in more than one embodiment of the present invention (importantly, such phrases do not necessarily refer to the same embodiment);

If the specification describes something as "exemplary" or an "example," it should be understood that refers to a non-exclusive example;

The terms "about" or approximately" or the like, when used with a number, may mean that specific number, or alternatively, a range in proximity to the specific number, as understood by persons of skill in the art field; and If the specification states a component or feature "may," "can," "could," "should," "would," "preferably," "possibly," "typically," "optionally," "for example," "often," or "might" (or other such language) be included or have a characteristic, that particular component or feature is not required to be included or to have the characteristic. Such component or feature may be optionally included in some embodiments, or it may be excluded.

Embodiments of the disclosure include systems and methods for indicating when a gas detector is out of compliance. Companies that require their employees to wear portable gas detectors must manage the maintenance and settings on the device to show compliance with their safety policies. With hundreds of devices to manage, it is a very difficult job to ensure every gas detector has had the required maintenance to ensure the workers are protected.

A Bluetooth version 4+ Bluetooth Low Energy (BLE) enabled wireless gas-detector may allow for an advertisement (or broadcast) packet to be transmitted from the gas detector. This advertisement packet may contain information about the gas detector to allow remote auditing from any BLE enabled remote listening device. This auditor device may be in the form of a mobile device, such as a cell phone or tablet, or any other BLE enabled device.

Gas detectors may be equipped with a BLE radio and may be programmed to send out advertisement packets when the detector is out of compliance. An auditor (such as a safety inspector or supervisor) may have a BLE enabled mobile device comprising an application that would receive the gas detector's advertisement packets and notify the auditor of any non-compliance, via a display on the mobile device. Alternatively a fixed automatic auditor device could be installed which would detect the gas detector's advertisements and give visual and/or audible indications automatically based on the received advertisement packet. It may also communicate the information in the advertisement packet back to a central location for logging and monitoring purposes.

Referring now to FIG. 1, a system 100 is shown, wherein the system 100 comprises one or more gas detectors 102 carried by users. The gas detector 102 may comprise a BLE communicator 104, which may comprise a transmitter, receiver, and/or transceiver. The gas detector 102 may comprise any type of gas detector operable to detect gas levels in the environment and provide alerts, alarms, and other indications to a user. In some embodiments, the gas detector 102 may be operable to communicate with a central monitoring station. In some embodiments, the gas detector 102 may comprise other wireless communication capabilities.

The gas detector may also comprise a user interface 110 operable to interact with a user, wherein the user interface may comprise a display, one or more lights, one or more beepers, and one or more buzzers, as well as other indicators. Additionally, in some embodiments, the gas detector 102 may comprise one or more buttons 108 for input from a user to the gas detector 102.

The gas detector 102 may comprise a processor 114 and storage 116 for receiving information about the settings and maintenance of the gas detector 102. The processor 114 may determine if the gas detector 102 is not in compliance with standards input to the gas detector 102, including maintenance and testing of the gas detector, and the settings active on the gas detector 102. If there the received information does not meet the compliance standards, an advertisement packet may be generated by the gas detector 102, wherein the advertisement packet contains the non-compliant information. The advertisement packet may also contain a user and/or gas detector identifier. Then the advertisement packet may be broadcast over BLE by the gas detector 102.

The system 100 may also comprise one or more auditor device, such as a mobile auditor device 120 or a fixed auditor device 130. The gas detector may be operable to communicate with one or both of the auditor devices. In some embodiments, a worksite may comprise a plurality of auditor devices, including mobile auditor devices 120 and or fixed fixed auditor devices 130.

A mobile auditor device 120 may be carried by an auditor, safety inspector or supervisor in the work area, wherein the mobile auditor device 120 may be operable to receive advertisement packets from a plurality of gas detectors 102. The mobile auditor device 120 may comprise a BLE communicator 126 (which may at least comprise a BLE receiver) operable to receive the advertisement packets from the gas detector(s) 102. The mobile auditor device 120 may also comprise a display 122 and an application 124 operable to process the received advertisement packets, and display the information contained in the advertisement packets. The information may comprise the user and/or gas detector identifier, and the non-compliant information, which may be a general non-compliance indication, or it may comprise the specific maintenance, testing, or settings that are non-compliant on the gas detector 102.

A fixed (or stationary) auditor device 130 may be placed at significant areas in a work area, such as check points, entry points, doors, and/or turnstiles. Therefore, everyone entering a work area would need to pass by the fixed auditor device 130, allowing the auditor device 130 to be within the BLE range of the gas detector(s) 102. The fixed auditor device 130 may be operable to receive advertisement packets from a plurality of gas detectors 102. The fixed auditor device 130 may comprise a BLE communicator 136 (which may at least comprise a BLE receiver) operable to receive the advertisement packets from the gas detector(s) 102. The fixed auditor device 130 may also comprise one or more indicators 132, which may comprise lights, beepers, buzzers, etc., which may be activated when the fixed auditor device 130 receives an advertisement packet, indicating non-compliance, from a gas detector 102. In some embodiments, the indicators 132 of the fixed auditor device 130 may also comprise a display, operable to display the information contained in the advertisement packer received from the gas detector 102.

Figure 2:
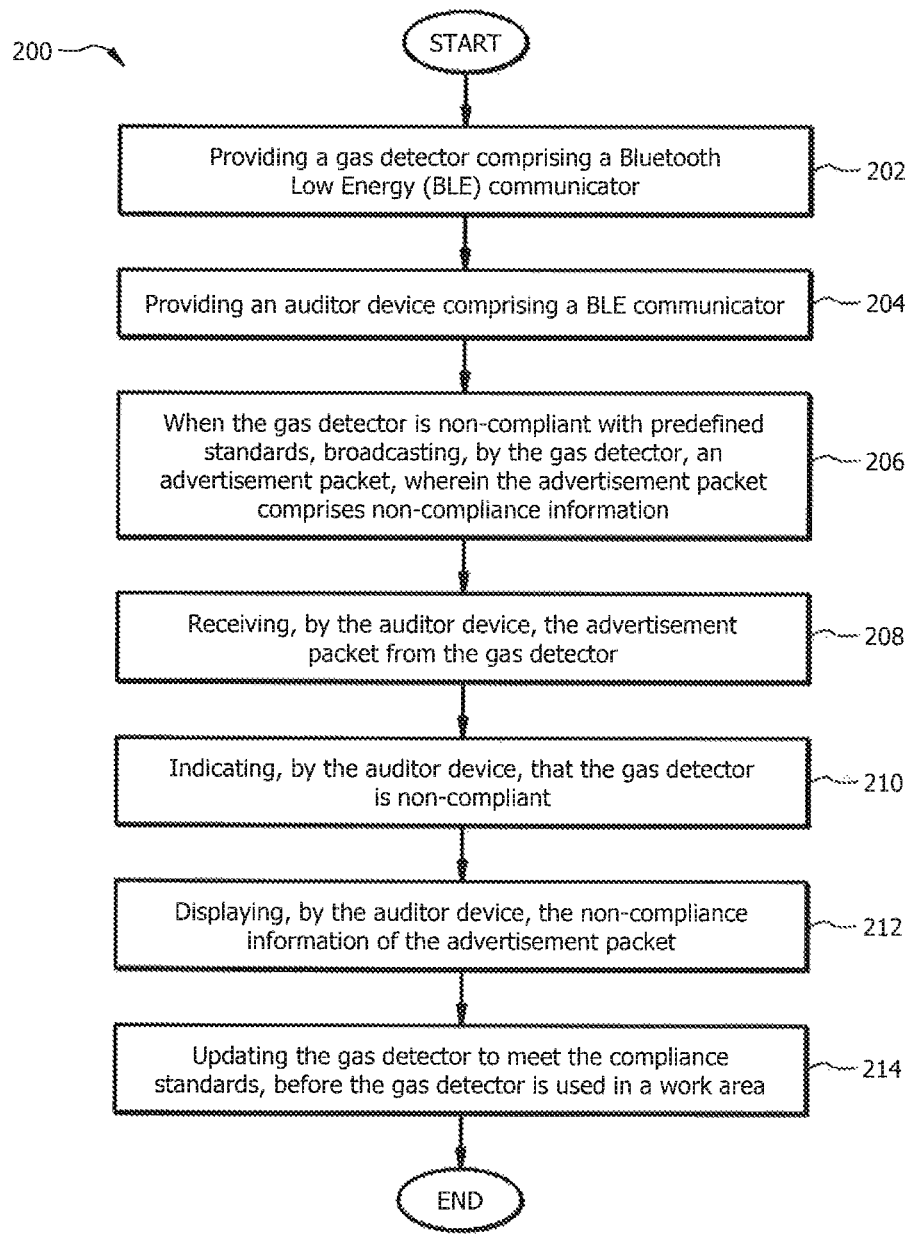
FIG. 2 illustrates a method for indicating when a gas detector is non-compliant according to an embodiment of the disclosure.

FIG. 2 illustrates an exemplary embodiment of a method 200 for indicating when a gas detector is non-compliant. At step 202, a BLE enabled gas detector may be provided. At step 204, a BLE enabled auditor device may be provided. At step 206, when the gas detector is non-compliant with predefined standards, the gas detector may broadcast an advertisement packet, wherein the advertisement packet comprises non-compliance information. In some embodiments, the non-compliance information may comprise the user and/or gas detector identifier, and a general non-compliance indication, or a specific maintenance, testing, or settings that are non-compliant on the gas detector. In some embodiments, the standards may be input to the gas detector. In a Ile embodiments, the advertisement packet may be broadcast to any BLE enabled device within the range of the gas detector.

At step 208, the auditor device may receive the advertisement packet from the gas detector. At step 210, the auditor device may indicate that the gas detector is non-compliant. Indicating that the gas detector is non-compliant may comprise initiating an alarm, a light, a beeper, and/or a buzzer. In some embodiments, at step 212, the auditor device may display the non-compliance information from the advertisement packet. In some embodiments, at step 214, the gas detector be updated to meet the compliance standards before the gas detector is used in the work area.

In some embodiments, the auditor device may comprise a mobile auditor device, which may be carried by an auditor, supervisor, or safety inspector in the worksite. In some embodiments, the method 200 may further comprise bringing the mobile auditor device within the broadcast range of the gas detector. In some embodiments, the auditor device comprises a fixed auditor device, which is placed at a significant area, such as an entry point, a check point, a door, and a turnstile. In some embodiments, the method 200 may further comprise bringing the gas detector in proximity to the fixed auditor device, such that the fixed auditor device is within the broadcast range of the gas detector.

While various embodiments in accordance with the principles disclosed herein have been shown and described above, modifications thereof may be made by one skilled in the art without departing from the spirit and the teachings of the disclosure. The embodiments described herein are representative only and are not intended to be limiting. Many variations, combinations, and modifications are possible and are within the scope of the disclosure. Alternative embodiments that result from combining, integrating, and/or omitting features of the embodiment(s) are also within the scope of the disclosure. Accordingly, the scope of protection is not limited by the description set out above, but is defined by the claims which follow, that scope including all equivalents of the subject matter of the claims. Each and every claim is incorporated as further disclosure into the specification and the claims are embodiment(s) of the present invention(s).

Furthermore, any advantages and features described above may relate to specific embodiments, but shall not limit the application of such issued claims to processes and structures accomplishing any or all of the above advantages or having any or all of the above features.

Additionally, the section headings used herein are provided for consistency with the suggestions under 37 C.F.R. 1.77 or to otherwise provide organizational cues. These headings shall not limit or characterize the invention(s) set out in any claims that may issue from this disclosure. Specifically and by way of example, although the headings might refer to a "Field," the claims should not be limited by the language chosen under this heading to describe the so-called field. Further, a description of a technology in the "Background" is not to be construed as an admission that certain technology is prior art to any invention(s) in this disclosure. Neither is the "Summary" to be considered as a limiting characterization of the invention(s) set forth in issued claims. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of the claims shall be considered on their own merits in light of this disclosure, but should not be constrained by the headings set forth herein.

Use of broader terms such as comprises, includes, and having should be understood to provide support for narrower terms such as consisting of, consisting essentially of, and comprised substantially of. Use of the term "optionally," "may," "might," "possibly," and the like with respect to any element of an embodiment means that the element is not required, or alternatively, the element is required, both alternatives being within the scope of the embodiment(s). Also, references to examples are merely provided for illustrative purposes, and are not intended to be exclusive.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method for indicating when a gas detector is not in compliance with predefined compliance standards comprising:
   providing the gas detector comprising a first Bluetooth Low Energy communicator;

providing an auditor device comprising a second Bluetooth Low Energy communicator;
determining, by a processor of the gas detector, that the gas detector is not in compliance with predefined compliance standards;
generating, by the processor of the gas detector in response to determining that the gas detector is not in compliance with the predefined compliance standards, an advertisement packet, wherein the advertisement packet comprises: 1) non-compliance information, and 2) at least one of a user identifier or a device identifier, wherein the non-compliance information comprises at least one of: a general non-compliance indication, or specific maintenance, testing, and settings that are not in compliance with predefined compliance standards on the gas detector;
broadcasting, by the gas detector, the advertisement packet when the gas detector is not in compliance with the predefined compliance standards;
receiving, by the auditor device, the advertisement packet from the gas detector; and
indicating, by the auditor device, that the gas detector is not in compliance with predefined compliance standards based on the received advertisement packet.

2. The method of claim 1, wherein the non-compliance information comprises one or more of the following: a user identifier, a gas detector identifier, a general non-compliance indication, and specific maintenance, testing, and settings that are non-compliant on the gas detector.

3. The method of claim 1, further comprising inputting the predefined compliance standards to the gas detector.

4. The method of claim 1, further comprising displaying, by the auditor device, the non-compliance information of the advertisement packet.

5. The method of claim 1, further comprising updating the gas detector to meet the predefined compliance standards, before the gas detector is used in a work area.

6. The method of claim 1, wherein the advertisement packet is broadcast to any Bluetooth Low Energy enabled device within the range of the gas detector.

7. The method of claim 1, wherein indicating that the gas detector is non-compliant comprises initiating an alarm, a light, a beeper, and/or a buzzer of the auditor device.

8. The method of claim 1, wherein indicating that the gas detector is non-compliant comprises displaying a message on a display of the auditor device.

9. The method of claim 1, wherein the auditor device comprises a mobile auditor device, which is carried by an auditor, supervisor, or safety inspector in a worksite.

10. The method of claim 1, wherein the auditor device comprises a fixed auditor device, which is placed at one of the following: an entry point, a check point, a door, and a turnstile.

11. A method for indicating when a gas detector is not in compliance with predefined compliance standards comprising:
providing the gas detector comprising a first Bluetooth Low Energy communicator;
providing an auditor device comprising a Bluetooth Low Energy communicator;
determining, by the gas detector, that the gas detector is not in compliance with predefined compliance standards;
generating, by the gas detector, an advertisement packet containing non-compliance information in response to determining that the gas detector is not in compliance with the predefined compliance standards, wherein the advertisement packet comprises: 1) the non-compliance information, and 2) at least one of a user identifier or a device identifier, wherein the non-compliance information comprises at least one of: a general non-compliance indication, or specific maintenance, testing, and settings that are not in compliance with predefined compliance standards on the gas detector;
broadcasting, by the gas detector, the advertisement packet to any Bluetooth Low Energy enabled device within the broadcast range of the gas detector;
receiving, by the auditor device, the advertisement packet from the gas detector; and
indicating, by the auditor device, that the gas detector is not in compliance with predefined compliance standards based on the received advertisement packet.

12. The method of claim 11, wherein the auditor device comprises a mobile auditor device, which is carried by an auditor, supervisor, or safety inspector in a worksite.

13. The method of claim 12, further comprising bringing the mobile auditor device within the broadcast range of the gas detector.

14. The method of claim 11, wherein the auditor device comprises a fixed auditor device, which is placed at one of the following: an entry point, a check point, a door, and a turnstile.

15. The method of claim 14, further comprising bringing the gas detector in proximity to the fixed auditor device, such that the fixed auditor device is within the broadcast range of the gas detector.

16. A gas detector system comprising:
a gas detector device comprising a Bluetooth Low Energy communicator, wherein the gas detector is operable to:
determine that the gas detector does not meet predefined compliance standards;
generate, by the gas detector, an advertisement packet containing non-compliance information in response to the determination that the gas detector is not in compliance with the predefined compliance standards, wherein the advertisement packet comprises: 1) non-compliance information, and 2) at least one of a user identifier or a device identifier, wherein the non-compliance information comprises one or more of the following: a general non-compliance indication, or specific maintenance, testing, and settings that are not in compliance with predefined compliance standards on the gas detector; and
broadcast the advertisement packet via the Bluetooth Low Energy communicator; and
an auditor device comprising a Bluetooth Low Energy receiver, wherein the auditor device is operable to:
receive the advertisement packet via the Bluetooth Low Energy receiver; and
indicate that the gas detector is not in compliance with predefined compliance standards based on the received advertisement packet.

17. The system of claim 16, wherein the auditor device comprises a display and is further operable to display the non-compliance information.

18. The system of claim 16, wherein the auditor device comprises an application operable to receive the advertisement packet, process the advertisement packet, and display the information contained in the advertisement packet.

19. The system of claim 16, wherein the auditor device comprises a mobile auditor device, which is carried by an auditor, supervisor, or safety inspector in a worksite.

20. The system of claim 16, wherein the auditor device comprises a fixed auditor device, which is placed at one of the following: an entry point, a check point, a door, and a turnstile.

* * * * *

UNITED STATES PATENT AND TRADEMARK OFFICE
CERTIFICATE OF CORRECTION

PATENT NO. : 9,858,803 B2
APPLICATION NO. : 14/825107
DATED : January 2, 2018
INVENTOR(S) : Kelly Englot et al.

It is certified that error appears in the above-identified patent and that said Letters Patent is hereby corrected as shown below:

On the Title Page

Page (2), Item (56) OTHER PUBLICATIONS, Line 2: "reterived" should be "retrieved"

Page (2), Item (56) OTHER PUBLICATIONS, Line 6: "reterived" should be "retrieved"

In the Specification

Column 1, Line 23: delete "an"

Column 4, Line 43: "and or" should be "and/or"

Column 4, Line 44: "fixed fixed auditor" should be "fixed auditor"

Signed and Sealed this
Fifth Day of June, 2018

Andrei Iancu
*Director of the United States Patent and Trademark Office*